United States Patent [19]

Wang et al.

[11] 4,394,208
[45] Jul. 19, 1983

[54] ULTRASONIC BONDING

[75] Inventors: Kenneth Y. Wang, Greensboro, N.C.; Berlie R. Hill, Cana, Va.

[73] Assignee: Burlington Industries, Inc., Greensboro, N.C.

[21] Appl. No.: 290,714

[22] Filed: Aug. 6, 1981

[51] Int. Cl.$^3$ .................. B29C 27/08; B32B 31/20
[52] U.S. Cl. .................. 156/580.1; 156/296; 156/553; 156/555; 156/580.2; 156/583.1; 425/174.2
[58] Field of Search .................. 156/73.1, 181, 553, 156/555, 580.1, 580.2, 582, 73.2, 296, 290, 583.1, 324; 264/23; 425/174.2; 228/1 R, 1 B

[56] References Cited

U.S. PATENT DOCUMENTS

| | | | |
|---|---|---|---|
| 3,575,752 | 4/1971 | Carpenter | 156/73.1 |
| 3,733,238 | 5/1973 | Long et al. | 156/73.1 |
| 3,765,997 | 10/1973 | Dunning | 428/296 |
| 3,855,045 | 12/1974 | Brock | 156/62.2 |
| 3,879,256 | 4/1975 | Rust, Jr. | 156/73.1 |
| 3,949,128 | 4/1976 | Ostermeier | 428/296 |
| 4,090,897 | 5/1978 | Minick | 156/73.1 |
| 4,109,353 | 8/1978 | Mitchell et al. | 28/104 |
| 4,128,451 | 12/1978 | Sorce et al. | 156/582 |
| 4,259,399 | 3/1981 | Hill | 428/288 |

FOREIGN PATENT DOCUMENTS 2259203  6/1974  Fed. Rep. of Germany ... 156/580.1

Primary Examiner—Michael G. Wityshyn
Attorney, Agent, or Firm—Cushman, Darby & Cushman

[57] ABSTRACT

An apparatus and method are provided for producing a non-woven fabric ultrasonically without unacceptable streaking. A fibrous batt is continuously fed in a first direction toward and past a plurality of vibration sources and anvil. Energy is supplied to the vibration sources so that bonding of the fibrous batt in a non-woven fabric takes place at the vibration sources and anvil. Significant migration of fibers of the batt is positively prevented just prior to passage of the batt into contact with the vibration sources so that a streakless bonded non-woven fabric is produced. Migration may be positively prevented by disposing a heated roller of hard material just upstream of the vibration sources, and providing a second compression roller upstream of the heated roller.

15 Claims, 2 Drawing Figures

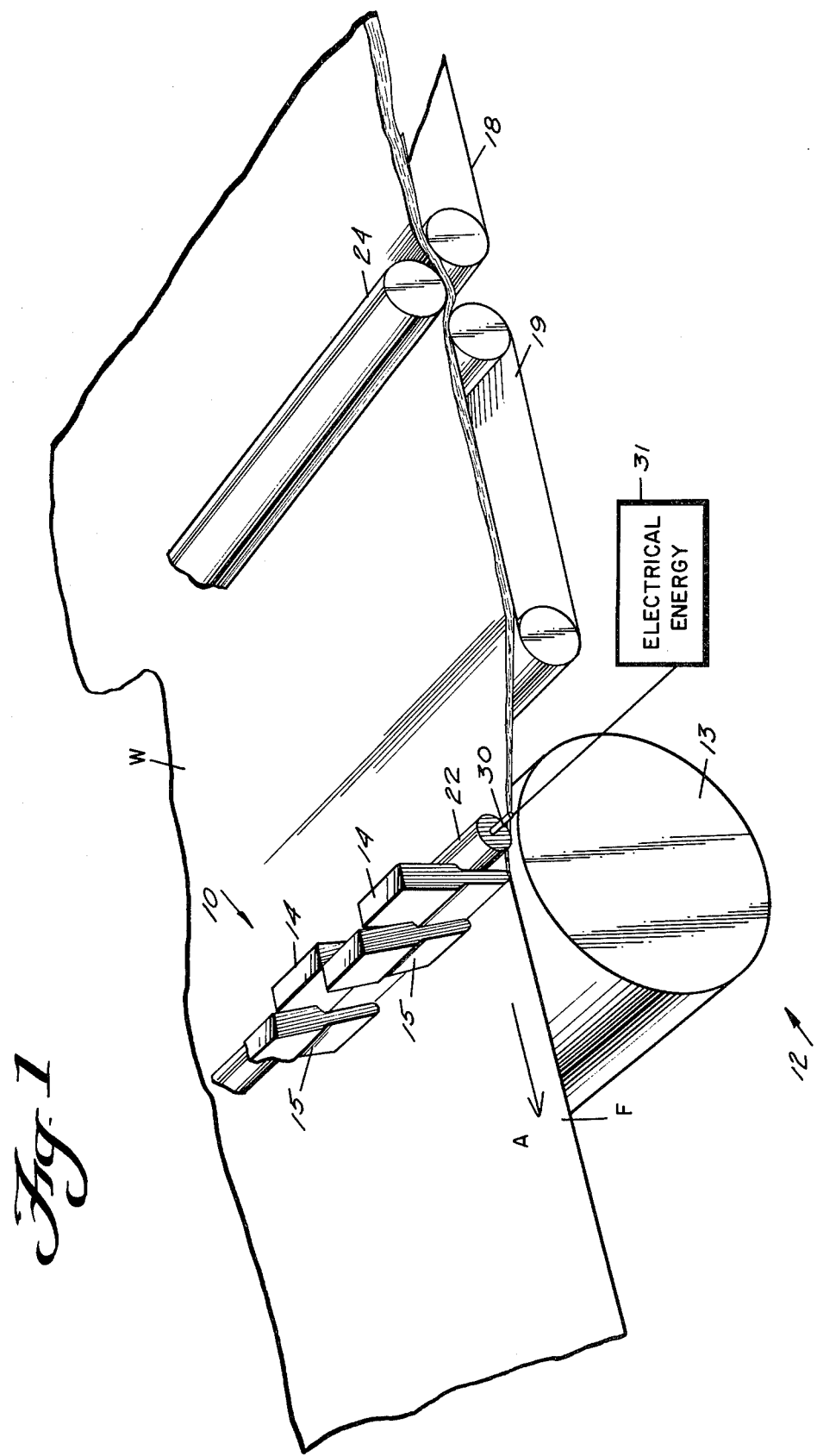

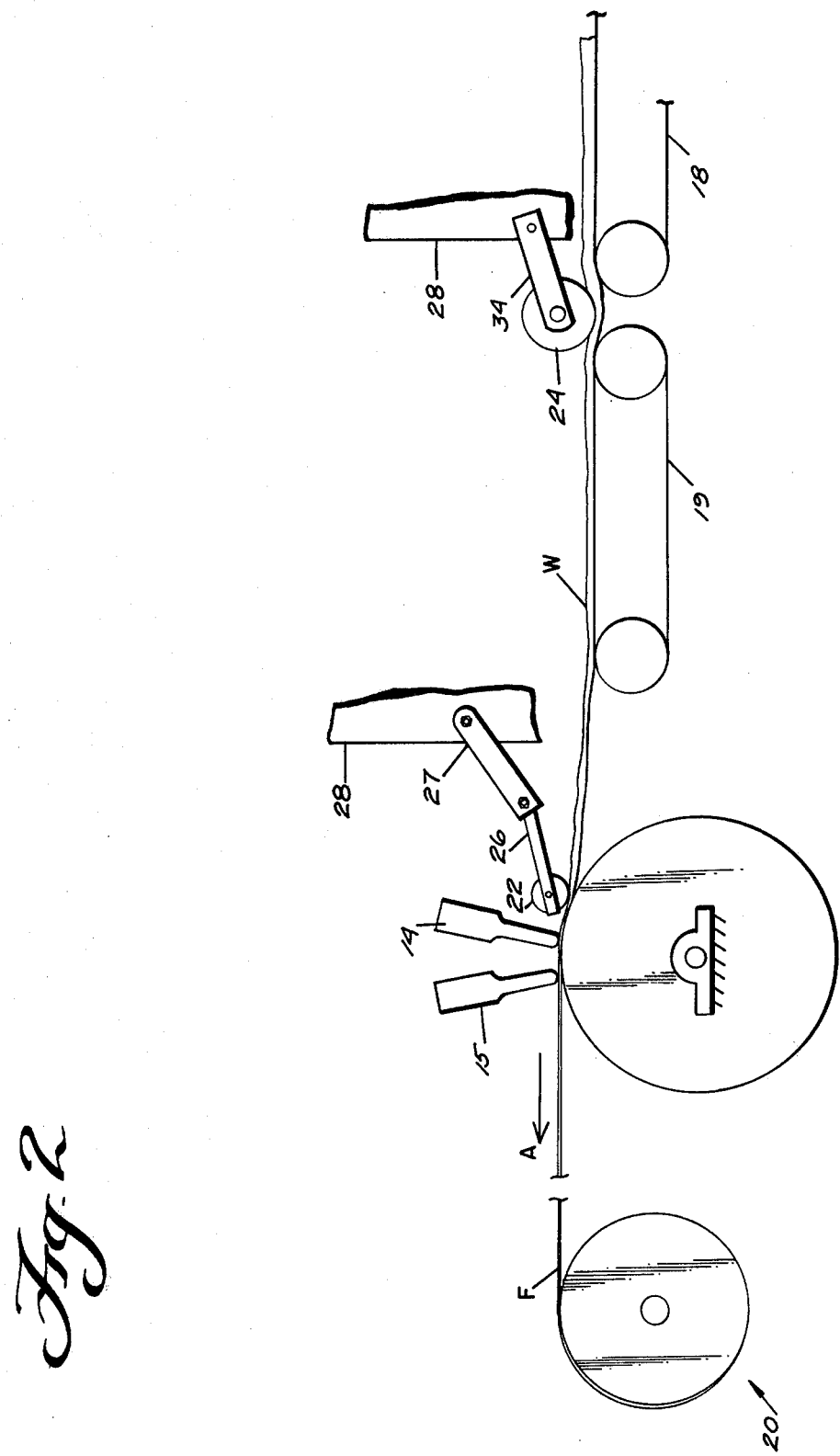

ULTRASONIC BONDING

BACKGROUND AND SUMMARY OF THE INVENTION

In the production of fabrics utilizing ultrasonic energy, a wide variety of products can be produced. One particularly useful technique for the production of fabric ultrasonically is to form a non-woven fabric from a batt of primarily thermoplastic fibers. For the practical production of such webs it is necessary to form the fabric "full width," and to accomplish that it is necessary to provide a plurality of ultrasonic vibration sources disposed to act upon substantially the entire width of the web, the web width necessarily being greater than the width of a single vibration source under present technology. When forming the non-woven webs utilizing a plurality of ultrasonic vibration sources (particularly for a staggered configuration of vibration horns such as shown in U.S. Pat. No. 3,733,238 the disclosure of which is hereby incorporated by reference herein) there is a tendency for the non-woven fabric to be formed with a plurality of streaks extending in the longitudinal direction of the web. The streaks are clearly visible to the eye both before the fabric has been finished and subsequent to finishing, and render the fabric commercially unacceptable for many end uses.

The nonwoven fabric bonding process according to the present invention is distinct from the more conventional ultrasonic quilting process as describedin U.S. Pat. No. 3,733,238. The coverage of the "bond points" in a quilting process is substantially less than in the nonwoven fabric bonding according to the invention. The surface of the quilting material is a consolidated sheet rather than loose fibers that can be moved around. The high density of bond (or welding) points and the movable fibers contribute to a condition whereby "streaking" can easily occur, which streaking is desirably avoided according to the invention.

According to the present invention a method and apparatus are provided for producing a non-woven streakless web. According to the present invention the source of the streaking problem has been identified and apparatus and method techniques are provided to remedy the problem.

According to the present invention it has been determined that the streaks apparently are created due to a migration phenomena occurring as the fiberous batt passes beneath the vibration sources, particularly where first and second staggered rows of overlapped ultrasonic horns are provided and the web passes beneath the horns. When the web passes beneath the first row of horns and is bonded, the unbonded and relatively raised remaining strips between the horns of the first row experience some migration, flow, or movement of fibers therein to overlap slightly into the bonded strips along their adjacent edges. This overflow of fiber from the unbonded strips into the bonded strips results in a surplus of fiber along the edges between the bonded and unbonded areas so that when the web passes beneath the second row of horns and is bonded a relatively raised portion or "streak" is produced.

According to the present invention a method and apparatus are provided for producing a streakless bonded non-woven fabric by preventing significant migration of fibers in the fibrous batt just prior to bonding. This is accomplished by applying a compressive force to the fibrous batt web just prior to passage thereof into operative engagement with the vibration sources, as by providing a roller of hard material just before the vibration sources. If desired, the roller may be heated (e.g. to about 250° F.) to more permanently deform and compress the fibers before they are led to the vibration sources. Migration can be further prevented by providing another compression roller upstream of the first roller, as between a vacuum screen and conveyor belt transporting the fibrous batt.

It is the primary object of the present invention to produce a substantially streakless bonded non-woven web from a batt of primarily ultrasonically fusible fibers. This and other objects of the invention will become clear from an inspection of the detailed description of the invention, from the appended claims.

BRIEF DESCRIPTION OF THE DRAWINGS

FIG. 1 is a partial perspective schematic view of exemplary apparatus for producing a non-woven fabric according to the present invention; and FIG. 2 is a side schematic view of the apparatus of FIG. 1 additionally showing the fabric take-up and roller mounting.

DETAILED DESCRIPTION OF THE DRAWINGS

Apparatus for vibration bonding of material according to the present invention includes a plurality of conventional ultrasonic vibration sources shown generally at 10, and anvil means cooperating with the vibration sources to affect bonding, shown generally at 12. The vibration sources 10 and the anvil means 12 may take a wide variety of configurations. One configuration with which the invention is particularly useful, as illustrated in the drawings, comprises an engraved roll 13 as the anvil means, and a plurality of staggered horns as the ultrasonic vibration sources 10. The staggered horns include horns 14 disposed in a first row, and horns 15 disposed in the second row, such as shown in U.S. Pat. No. 3,733,238. The horns overlap along the width of the web W so that they act upon substantially the entire width of the web W.

The invention further comprises means for transporting the web W in a first direction A past, and between, the vibration sources 10 and anvil means 12. The transporting means in the embodiment illustrated in the drawings include a vacuum screen conveyor 18, a conveyor belt 19 and a take-up assembly 20 for taking up the non-woven fabric F produced.

The web W comprises a batt of thermoplastic fibers. A wide variety of blend of fibers, and web weights, may be utilized in the practice of the invention. For instance, the web may comprise all thermoplastic fibers, or primarily thermoplastic fibers, and blends of various fibers such as polyester and Heterofil. Normally, the web W will be fed alone between the sources 10 and anvil means 12, however, under some circumstances it may be fed with a sheet to which it is to be ultrasonically welded or may be fed with a carrier sheet (e.g. see U.S. Pat. NO. 4,259,399). The prime characteristic of the web W must be that it is formed primarily of ultrasonically fusable fibers, which fibers are disposed in a loose random batt.

According to the present invention means are provided for preventing any significant migration of fibers in the fibrous batt W just pior to bonding so that a substantially streakless bonded non-woven fabric F is produced. The migration preventing means preferably comprises means for applying a compressive force to the fibrous batt W just prior to passage thereof into operative engagement with any of the vibration sources 10, and in the preferred embodiment illustrated in the drawings includes the roller 22, and preferably also the roller 24.

The roller 22 is of hard material, preferably comprising a stainless steel roller of relatively small diameter (e.g. 1 inch diameter). It is mounted upstream of the first row of horns 14 spaced only a small distance therefrom (e.g. about ⅛ inch). A wide variety of different types of means may be provided for mounting the roller 22 adjacent the horns 14, one such means illustrated in FIG. 2 comprising a pair of sets of levers 26, 27, one set of levers 26, 27 being mounted on each side of the roller 22. The lever 27 is pivotably mounted to the machine frame 28 at one end thereof, pivotably mounted to lever 26 at the other end thereof, and lever 26 is pivotably mounted to roller 22. With such an arrangement the weight of the roller 22 alone provides the necessary compressive force to the fibers of the web W. A wide variety of other mounting means for the roller 22 may, of course, be provided, including pneumatic cyclinders, and spring means or the like for acting upon the roller 22 to apply desired compressive forces.

In order to enhance the ability of the roller 22 to prevent fiber migration the roller may be heated. As illustrated schematically in FIG. 1, a stationary electrically conductive rod 30 may pass through the roller 22, the rod 30 being supplied with electrical energy by source 31 so that the surface temperature of the roller 22 is elevated to about 250° F. the exact temperature may vary depending upon the fiber component of the web W, and other factors. When heated, the roller 22 more permanently deforms and compresses the fibers prior to passage to the sources 10 so that the chances of migration thereof are minimized.

Significant migration of fibers of the batt W may further be minimized by providing the second roller 24, upstream of the roller 22. In one exemplary form—that illustrated in the drawings—the roller 24 comprises a stainless steel roller having a diameter of about 4 inches and mounted by levers 34 on opposite ends thereof to the machine frame 28. The levers 34 mount the roller 24 so that it applies a compressive force by its own weight, and is disposed between the vacuum screen conveyor 18 and the conveyor belt 19. Of course, alternative mounting, positionings, and compressive force applying mechanisms may also be associated with the roller 24. While the roller 24 facilitates migration-prevention of the fibers of the web W, in many situations the roller 22 can alone prevent significant migration.

In a typical method of ultrasonically bonding a fibrous batt into a non-woven fabric according to the present invention, the batt W is continuously fed in a first (preferably horizontal) direction A toward and past the vibration sources 10 and anvil means 12. Energy is supplied to the vibration sources 10 so that bonding of the fibrous batt W into a non-woven fabric F takes place at the vibration sources 10, anvil 12 location. The fabric F is taken up on the take-up mechanism 20. Significant migration of fibers of the fibrous batt just prior to passage into contact with the vibration sources 10 is positively prevented. This is accomplished by first compressing the fibers of the web W with the roller 24, and then further compressing and deforming the fibers of the web (e.g. so that the web is compressed from a ½ inch thickness to about a 3/16 inch thickness) utilizing the roller 22 mounted just upstream of the horns 14. Fiber migration-prevention is further facilitated by heating the roller 22 so that the surface temperature thereof is about 250° F. The final fabric F produced according to the present invention is substantially streakless and therefore acceptable for a wide variety of commercial applications.

While the invention has been described above with respet to ultrasonic horns 14, 15 arranged in staggered rows and cooperating with a roller anvil, it is to be understood that the invention is also applicable to other vibration sources and anvil configurations (see U.S. Pat. No. 4,146,416 and German Offenlegungsschrift No. 2 259 203)—wherever the prevention of migration of fibers of a fibrous batt, or the like, is desirable.

It will thus be seen that according to the present invention a desired non-woven fabric is produced ultrasonically, and an advantageous method and apparatus for the production of the fabric have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, methods, and fabrics.

What is claimed:

1. Apparatus for vibration bonding of material comprising means for transporting in a first direction a batt of primarily ultrasonically fusible fibers to be vibration bonded into a bonded non-woven web;

a plurality of ultrasonic vibration sources disposed to act upon substantially the entire width of the web;

anvil means cooperating with said vibration sources to effect bonding, said anvil means disposed on the opposite side of the batt as said ultrasonic vibration sources; and means for preventing any significant migration of fibers in the fibrous batt just prior to bonding so that a substantially streakless bonded non-woven web is produced.

2. Apparatus as recited in claim 1 wherein said migration preventing means comprises means for applying a compressive force to said fibrous batt just prior to passage thereof into operative engagement with any of said vibration sources.

3. Apparatus as recited in claim 2 wherein said compressive force applying means comprise a roller of hard material.

4. Apparatus as recited in claim 3 further comprising means for heating said roller to facilitate fiber migration prevention when said roller acts upon said fibrous batt.

5. Apparatus as recited in claim 3 wherein said roller has a diameter of about 1 inch.

6. Apparatus as recited in claims 3 or 5 wherein said roller comprises a stainless steel roller.

7. Apparatus as recited in claim 3 wherein said roller is a first roller, and further comprising a second roller disposed upstream of said first roller, and for applying a compressive force to said batt.

8. Apparatus as recited in claim 7 wherein said transporting means include a vacuum screen conveyor and a conveyor belt, said conveyor belt disposed downstream of said vacuum screen conveyor; and wherein said migration-preventing means comprise means for mounting said second roller between said vacuum screen conveyor and conveyor belt in said first direction.

9. Apparatus as recited in claim 3 wherein said migration-preventing means comprise means for mounting said roller so that is applies compressive forces by its weight alone.

10. Apparatus as recited in claims 1, 2, or 3 wherein said plurality of ultrasonic vibration sources comprise first and second rows of staggered, overlapping ultrasonic horns and wherein said anvil means comprises an anvil roller.

11. Apparatus for vibration welding of material comprising
   means for transporting in a first direction a web of material to be vibration welded;
   a plurality of ultrasonic vibration sources disposed to act upon substantially the entire width of the web;
   anvil means cooperating with said vibration sources to effect welding, said anvil means disposed on the opposite side of the web as said ultrasonic vibration sources;
   a roller of hard material extending substantially the entire width of the web; and
   means for mounting said roller just before any of said ultrasonic vibration sources so that said roller applies a force to the web.

12. Apparatus as recited in claim 11 wherein said roller mounting means comprise means for mounting said roller so that by its weight alone it applies a compressive force to the web.

13. Apparatus as recited in claims 11 or 12 further comprising means for heating said roller.

14. Apparatus as recited in claim 13 wherein said roller is of electrically conductive material, and wherein said roller heating means comprises a stationary electrically conductive rod electrically interconnected to said roller and a source of electrical energy.

15. Apparatus as recited in claim 11 wherein said roller comprises a first roller, and further comprising:
   a second roller of hard material; and
   means for mounting said second roller upstream of said first roller in the web direction of transport, and in operative association with the web for applying a compressive force to the web.

* * * * *